United States Patent
Nevolin (10) Patent No.: US 10,884,992 B2
(45) Date of Patent: Jan. 5, 2021

(54) MULTI-STREAM OBJECT-BASED UPLOAD IN A DISTRIBUTED FILE SYSTEM

(71) Applicant: EMC IP Holding Company LLC, Hopkinton, MA (US)

(72) Inventor: Andrey Nevolin, Moscow (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 945 days.

(21) Appl. No.: 15/208,866

(22) Filed: Jul. 13, 2016

(65) Prior Publication Data
US 2017/0185629 A1    Jun. 29, 2017

(30) Foreign Application Priority Data
Dec. 23, 2015  (RU) .................................. 2015155279

(51) Int. Cl.
| G06F 7/00 | (2006.01) |
| G06F 17/30 | (2006.01) |
| G06F 16/182 | (2019.01) |
| H04L 29/08 | (2006.01) |
| G06F 16/11 | (2019.01) |
| G06F 9/455 | (2018.01) |

(52) U.S. Cl.
CPC ........ *G06F 16/182* (2019.01); *G06F 9/45558* (2013.01); *G06F 16/116* (2019.01); *H04L 67/06* (2013.01); *H04L 67/1097* (2013.01)

(58) Field of Classification Search
CPC ......... G06F 17/30194; G06F 17/30076; H04L 67/06
USPC .......................................................... 707/827
See application file for complete search history.

(56) References Cited

U.S. PATENT DOCUMENTS

| 8,181,180 B1* | 5/2012 | Anderson ................. G06F 9/52 718/102 |
| 9,766,987 B2* | 9/2017 | Kumarasamy ...... G06F 11/1469 |
| 2002/0178297 A1* | 11/2002 | Lister .................... G06F 9/5061 719/310 |
| 2006/0020646 A1* | 1/2006 | Tee .......................... G06F 16/14 |

(Continued)

OTHER PUBLICATIONS

"Toward a Unified Object Storage Foundation for Scalable Storage Systems", Karakoyunlu et al., 2013 (Year: 2013).*
"EMC Isilon Best Practices for Hadoop Data Storage" (2014).

*Primary Examiner* — Binh V Ho
(74) *Attorney, Agent, or Firm* — Ryan, Mason & Lewis, LLP (57) ABSTRACT

A distributed file system is provided having multi-stream object-based data upload. A distributed file system comprises a plurality of client processing nodes, wherein one or more of the plurality of client processing nodes selectively operate in one or more of an object-based mode and a POSIX-style mode; and a plurality of storage nodes, wherein one or more of the plurality of client processing nodes transfer multiple portions of the same data entity (e.g., an object or a file) substantially simultaneously to one or more of the storage nodes. A uniform interface is optionally provided to access the object-based mode and the POSIX-style mode. The multiple portions of the same data entity comprise blocks and multiple blocks can be committed substantially simultaneously in parallel. Committed data containing an error that was uploaded using the object-based mode becomes unavailable for further object-based access until the error is repaired using the POSIX-style mode.

22 Claims, 9 Drawing Sheets

(56) References Cited

U.S. PATENT DOCUMENTS

| | | | |
|---|---|---|---|
| 2006/0288102 A1* | 12/2006 | Spicer | H04L 43/065 |
| | | | 709/224 |
| 2007/0011210 A1* | 1/2007 | Flamma | G06F 3/0601 |
| 2008/0005752 A1* | 1/2008 | Morris | G06F 9/45512 |
| | | | 719/331 |
| 2008/0046443 A1* | 2/2008 | Fachan | G06F 12/0804 |
| 2010/0250809 A1* | 9/2010 | Ramesh | G06F 9/526 |
| | | | 710/200 |
| 2011/0277009 A1* | 11/2011 | Damola | H04N 21/632 |
| | | | 725/116 |
| 2012/0233228 A1* | 9/2012 | Barton | G06F 16/178 |
| | | | 707/827 |
| 2012/0303736 A1* | 11/2012 | Novotny | H04L 67/1008 |
| | | | 709/213 |
| 2013/0305006 A1* | 11/2013 | Altman | G06F 3/0679 |
| | | | 711/163 |
| 2015/0199147 A1* | 7/2015 | Goldberg | G06F 3/0644 |
| | | | 711/170 |
| 2015/0373012 A1* | 12/2015 | Bartz | H04L 67/36 |
| | | | 726/7 |
| 2016/0004549 A1* | 1/2016 | Emaru | G06F 9/45558 |
| | | | 718/1 |
| 2016/0080481 A1* | 3/2016 | Bisht | H04L 67/1004 |
| | | | 370/235 |
| 2017/0123873 A1* | 5/2017 | Baddourah | G06F 11/0715 |

\* cited by examiner

*FIG. 8*

MULTI-STREAM OBJECT-BASED UPLOAD IN A DISTRIBUTED FILE SYSTEM

FIELD

The field relates generally to file systems, and more particularly, to techniques for multi-stream object based upload in such file systems.

BACKGROUND

Object-scale file systems may comprise billions if not trillions of objects. Further, while file system interfaces are ubiquitous and present greater usability, traditional file system interfaces are not suitable for accessing such large object stores. While objects stores excel as a capacity storage solution, they are not as usable or familiar to users as file system interfaces. It would be advantageous to be able to present a file system interface on top of, for example, a trillion-scale object store to provide added usability, together with the scalability of object stores and without the bottleneck of an overwhelming amount of metadata (either in terms of performance or the capacity required to store the metadata). It would be desirable to choose between per-object performance under a POSIX-style data access, and load balancing and aggregate performance under an object-based data access.

A need therefore exists for a distributed file system that provides a uniform interface to enable both object-based data access and POSIX-style data access. A further need exists for a distributed file system that provides multi-stream object-based data upload.

SUMMARY

Illustrative embodiments of the present invention provide a distributed file system having multi-stream object-based data upload. In one embodiment, a distributed file system comprises a plurality of client processing nodes, wherein one or more of the plurality of client processing nodes selectively operate in one or more of an object-based mode and a POSIX-style mode; and a plurality of storage nodes, wherein one or more of the plurality of client processing nodes transfer multiple portions of the same data entity (e.g., an object or a file) substantially simultaneously to one or more of the storage nodes.

In at least one embodiment, a uniform interface is provided to access the object-based mode and the POSIX-style mode. In one or more embodiments, the multiple portions of the same data entity comprise blocks and multiple blocks are committed substantially simultaneously in parallel.

In an exemplary embodiment, committed data containing an error that was uploaded using the object-based mode becomes unavailable for further object-based access until the error is repaired using the POSIX-style mode.

In one or more embodiments, one or more clients write the same portion of the same data entity multiple times. After a client receives an acknowledgement that a block has been committed, then for any subsequent commit, new data overwrites old data in case of a data overlap with a previous block.

As noted above, illustrative embodiments described herein provide significant improvements relative to conventional file systems. In some of these embodiments, a uniform interface enables both object-based data access and POSIX-style data access and thereby allows improved data access.

In at least one embodiment, multi-stream object-based data upload is provided to increase the upload speeds of object data.

DETAILED DESCRIPTION

Illustrative embodiments of the present invention will be described herein with reference to the storage of files and objects in an exemplary distributed file system and associated clients, servers, storage arrays and other processing and storage devices. It is to be appreciated, however, that the invention is not restricted to use with the particular illustrative distributed file system and device configurations shown. Accordingly, the term "file system," as used herein, is intended to be broadly construed.

In one or more embodiments, techniques are provided for multi-stream object upload in a distributed file system. According to one aspect of the invention, a single file system can simultaneously operate in an object-based mode and a POSIX-style mode. A uniform interface is provided that enables both object-based and POSIX-style data access. In one exemplary embodiment, the interface resembles an existing Hadoop™ Distributed File System (HDFS) interface.

According to another aspect of the invention, flexible object repairs are provided to correct upload errors. In one or more embodiments, extended error-reporting capabilities of the file system are employed with cooperation between object-based and POSIX-style access modes.

Figure 1:
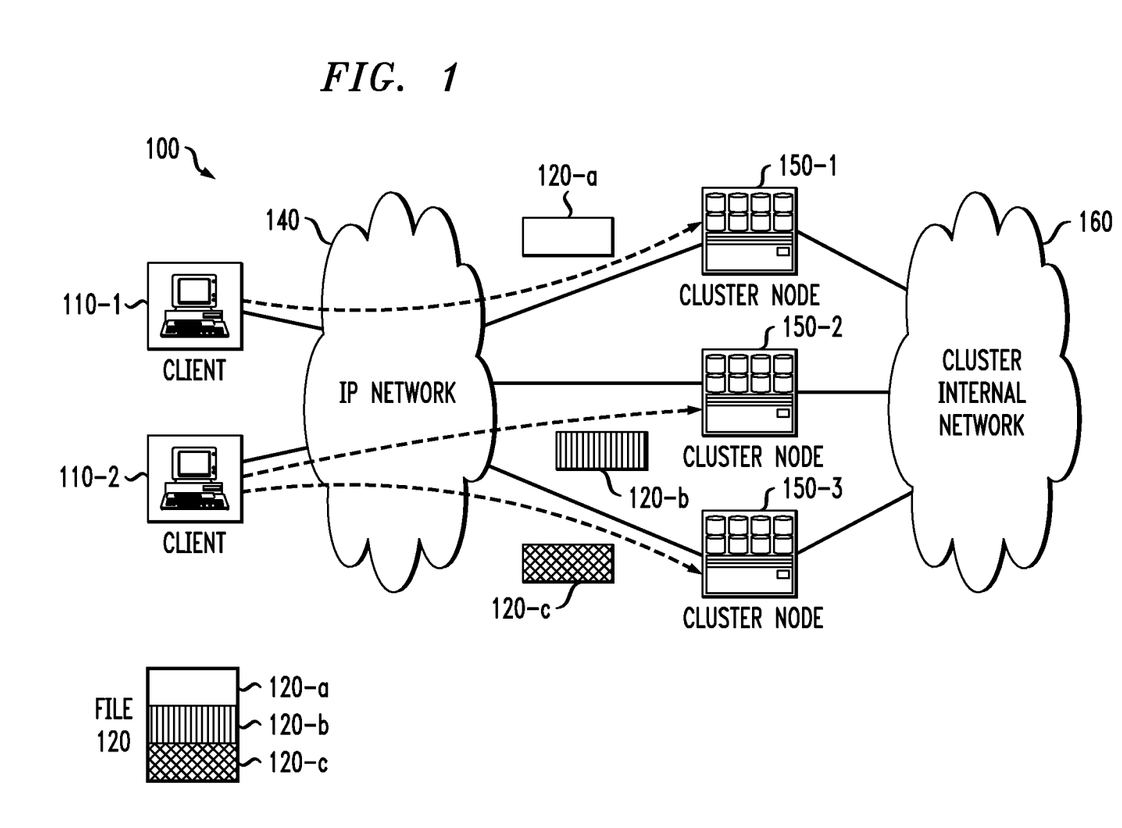
FIG. 1 illustrates a distributed file system in accordance with one or more embodiments of the invention.

As used herein, the term "multi-stream" means that different parts of the same file may be committed to the file system in parallel. FIG. 1 illustrates a distributed file system 100 in accordance with one or more embodiments of the invention. As shown in FIG. 1 a plurality of client machines, such as client machines 110-1 and 110-2, transfer multiple parts 120-a, 120-b, 120-c of the same file 120 simultaneously over an Internet Protocol (IP) network 140 to a plurality of cluster nodes, such as cluster nodes 150-1 through 150-3. The plurality of cluster nodes 150 communicate over a cluster internal network 160. In one variation, the multiple parts 120-a, 120-b, 120-c of the same file 120 are transferred by multiple threads running on the same client machine.

In one or more embodiments, the exemplary distributed file system 100 provides data access in an object-based manner, as well as legacy POSIX-style access, using a single unified interface, such as an interface based on the existing HDFS interface. In at least one embodiment, write operations in an object-based mode are similar to write operations in a POSIX-like mode.

In the event of errors during a multi-stream upload of objects, data that was already transferred cannot be finalized as an object because of gaps that would make an object non-monolithic. If an object cannot be finalized, the data may be lost. In HDFS, for example, this problem is solved by serializing block commits Serialization provides a guarantee that an object is always monolithic (though it still may not be transferred fully). The monolithic object may be finalized at any moment. The serialization, however, limits file system performance significantly and prohibits any object modifications except appending to the end of the file.

To overcome these inefficiencies, one or more embodiments of the invention provide multi-stream data commits. In addition, any data committed to the file system 100 can be finalized at any moment. In the case of errors during a data upload in an object-based mode, the committed data may become unavailable for object-based access. The data can be accessed and repaired, however, in a POSIX-like mode.

The file system 100 runs in a distributed environment. In one or more embodiments, the file system 100 is stateful and operates by providing two kinds of logical services: metadata service and block-level service (regardless of how these services are distributed in a physical environment). A lease should be taken by a client to write a file. The lease is associated with an identifier (ID) provided by a client. If several clients modify the same file simultaneously, all such clients should operate under the same ID. Read access in the file system 100 may be implemented in accordance with existing implementations.

As noted above, the interface of the file system 100 may be implemented, for example, using the HDFS file system interface. The metadata service of the exemplary file system 100 may be implemented, for example, using a distributed HDFS Namenode service. The block-level service of the exemplary file system 100 may be implemented, for example, using the HDFS Datanode service. See, for example, EMC Corp. "EMC Isilon Best Practices for Hadoop Data Storage," incorporated by reference herein in its entirety.

Write access to files is performed as discussed hereinafter. In addition, various aspects of the invention provide cooperation between the object-based access mode and the POSIX-like access mode.

Figure 2:
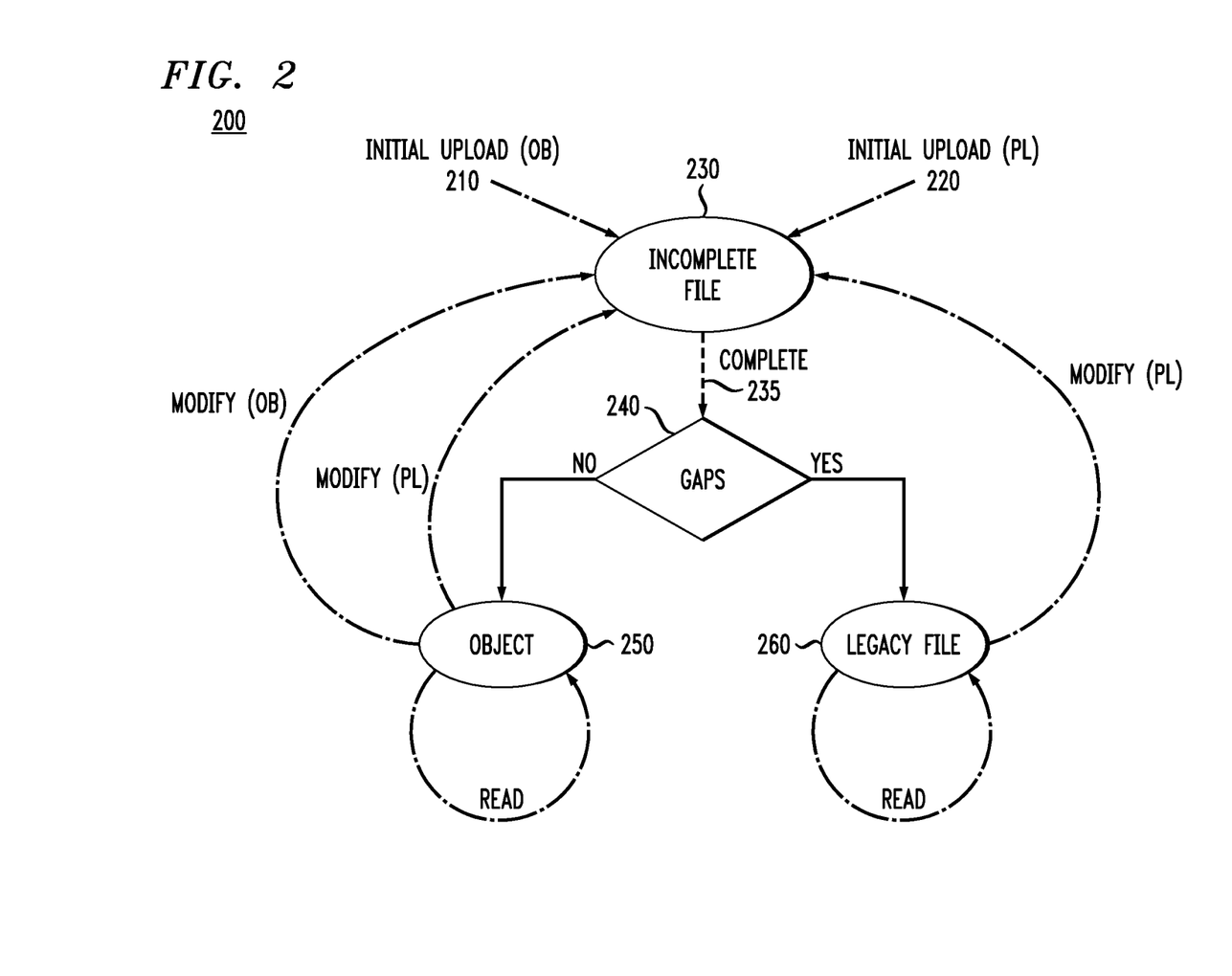
FIG. 2 is a state diagram illustrating an object-based mode coexisting with a POSIX-style mode within the same file system of FIG. 1.

FIG. 2 is a state diagram 200 illustrating the object-based mode coexisting with the POSIX-style mode within the single file system 100. In FIG. 2, "OB" indicates "object-based mode" and "PL" indicates "POSIX-like mode". In addition, dashed arrows in FIG. 2 represent client actions. States 230, 250 and 260 exist at the server. In addition, the server determines whether there is a gap during step 240.

Thus, a client can perform an initial upload in an object-based mode during step 210 or a POSIX-like mode during step 220 to establish an incomplete file state 230. An incomplete file state 230 is a file 120 that is under modification, i.e., it was created or opened for "write" and a client has not yet finished modifying the file 120. Exemplary functional specifications for the create and open operations are discussed further below in conjunction with FIGS. 4 and 5, respectively. Transitions to the "object" state 250 or "legacy file" state 260 occur when the file is "completed" and enters a "complete state" 235. As used herein, a "data entity" is an object in an object-based mode or a file in a POSIX-like mode. A file can enter a complete state 235 in two ways. A client can explicitly issue a "close" request to show that the client is not going to change the file anymore. An exemplary functional specification for a complete operation is discussed further below in conjunction with FIG. 6. In addition, a file can optionally be implicitly completed when a server detects that the client is not active for a predefined time period and the server decides to close the file itself. Generally, "completion" allows the file to become available for modification by other clients (i.e., the lease is released).

FIG. 2 illustrates the logic associated with objects 250 and legacy files 260 (as opposed to file system application programming interface (API) calls). Thus, "read" means that the file is first opened, then a "read" API request is called several times. "Modify" means that the file is first opened, then several "write" requests are called.

If a user accesses an already existing object and only reads it, then the user cannot change the object "quality." It will remain an object 250 or legacy file 260. If a user modifies an already existing object, the user can change the object from a legacy file 260 to an object 250 or from an object 250 to a legacy file 260. If a user creates an object from scratch, different scenarios may lead to an object 250 or legacy file 260.

Initially, the data may be uploaded to the file system 100 using any of the available operating modes. Depending on whether it is determined during step 240 that a resulting file has no gaps, the uploaded data may become available for further access either in both modes or only in a POSIX-like mode. Any object-based data may become unavailable for object-based access after further modifications (if gaps were introduced or other errors occurred, as discussed further below). Any data previously available only in POSIX-like mode may be accessed in an object-based mode if the gaps are filled.

Object modification can optionally be enabled in the file system 100. For example, object modification can be always allowed; always prohibited; regulated by file system attributes and/or policies; require an explicit "unlocking" for modification; when an object is modified a new version is created while the old one is preserved; and modification is allowed but changes are not accepted if errors occur during object modification.

Write Operations Overview

In both object-based operating mode and POSIX-like operating mode, access to the files occurs at a block level. All blocks are considered to be of the same size. A single write operation in both modes can be expressed as follows (using an exemplary C language notation):

block_location=get_location(metadata_service, block_number, client_id, &exception);

result=commit_block(block_location, data, offset, length, client_id, &exception); Here, the get_location operation requests a new block from the metadata service. "obj_id" is used to address the object. (In HDFS, a POSIX-style path is used as an object id. Here, "obj_id" is represented using any kind of addressing, such as hierarchical addressing, as in HDFS, or plain addressing, as in an S3 file system, as would be apparent to a person of ordinary skill in the art.) A block number is provided to the metadata service explicitly. This call looks very similar to HDFS "hdfs_datanode_new". HDFS, however, requires that blocks are transferred one-by-one only. The disclosed file system 100 allows simultaneous committing of multiple blocks. Hence, the ordinal block number is provided.

The commit_block call commits "length" bytes to a provided location starting from "offset" inside the block.

The get_location and commit_block calls require a "client_id" to confirm ownership of a lease associated with the given "obj_id."

Various kinds of exceptional situations are tracked by means of an "exception" parameter.

In one or more embodiments, the same interface is used for writing the files in both object-based and POSIX-like modes. In different modes, however, the calls are handled differently by the file system services. As discussed further below, the way that the calls are handled at the server side depends on the way that the file was initially opened.

Collision Handling

As discussed further below, collision handling depends on the operating mode (i.e., whether in an object-based mode or a POSIX-like mode). As used herein, a "collision" refers to a situation when clients (or even a single client) owning a lease for the same file attempt to write the same part of the file several times (simultaneously or not) before the lease is released.

Figure 3:
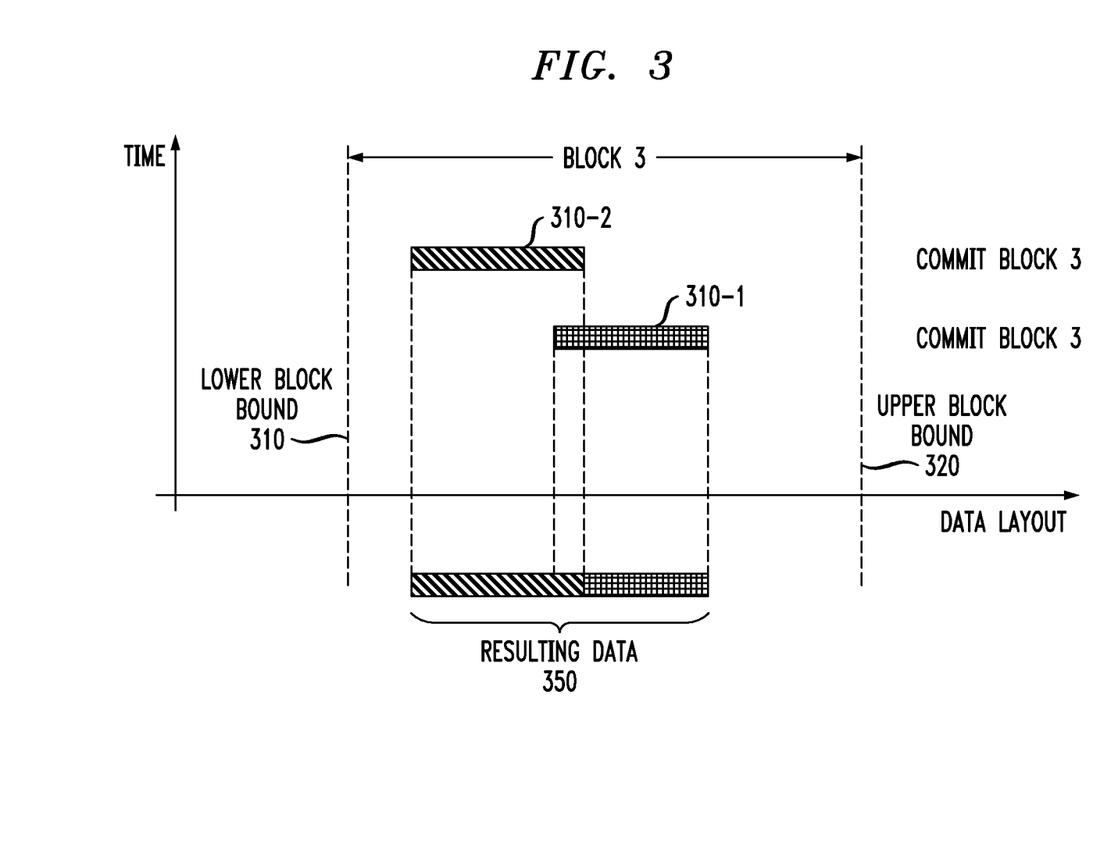
FIG. 3 illustrates collision handling for a POSIX-like mode in accordance with one or more exemplary embodiments of the invention.

FIG. 3 illustrates collision handling for a POSIX-like mode in accordance with one or more exemplary embodiments of the invention. In at least one embodiment, collisions are allowed. Different blocks with the same ordinal number will be committed. Also, for blocks with the same ordinal number, such as Block 3 in FIG. 3 having a lower block bound 310 and an upper block bound 320, if a client receives an acknowledgement about block commit, then for any commit initiated by any client after that point, in case of data overlap with the previous block, the new data overwrites the old data. In FIG. 3, commit 310-2 is younger (i.e., more recent) than commit 310-1. Thus, the resulting data 350 is the complete second committed block 310-2 and the non-conflicting portion of the first committed block 310-1. Of course, that is only true for the clients owning a lease to the file. It also should be noted that a commit of an incomplete block does not overwrite the whole block. Only a part that corresponds to "offset" and "length" of the commit request will be overwritten, as shown in FIG. 3.

Object-Based Mode Details

File access in an object-based mode is expected to be fast (relative to POSIX-style mode). At the same time, file access should be consistent with object-based model notation. Below are the exemplary requirements for the object-based mode in one or more embodiments:

1) Only full blocks can be committed to the file system 100. Only the last block of a file is allowed to be incomplete. Thus, the "offset" argument of the "commit_block" call should always be zero in an object-based mode. In addition, the "length" argument should be equal to the block size for all blocks, except possibly the last one.
2) No gaps are allowed inside the file.
3) Collision handling: If clients operating under the same lease attempt to write a block with the same number, the file system 100 allows the clients to do that but discards the block with that number. The discarded block is treated as a gap in the file.
4) Violation of Rules 1 or 2 is tolerated by the file system 100. When a violation of Rules 1 or 2 occurs, the file system 100 accepts the file (when it is completed 235), but makes further work with the file in object-based mode impossible. After that, the file still may be accessed but only in the POSIX-like mode.
5) A client is not allowed to open a file for Read-and-Write in this mode. The file may be opened either only for Read or only for Write.
6) Opening a file for Read (in object-based mode) while it is being written (in any mode) is not allowed.

The requirements listed above guarantee that, in one or more embodiments, file access in an object-based manner may be implemented efficiently.

There is no need to support a consistent view of an object across different storage nodes 150 and file system services (metadata and block services) until an object is completed 235. A consistent view of a particular object should be enforced only at two points in time: at object opening/creation and at object completion. Between these points, different parts of the file system 100 are not obliged to be "synchronized". A file system may optionally be forced to always maintain a coherent view of all files. A file system that is "de-synchronized" at particular points is considered a benefit of object-style access. Distributed parts of the metadata service (when it is implemented in a distributed manner) are not required to support a consistent view of an object. For example, different versions of a block number "3" may be registered by different parts of the metadata service. Different storage nodes may accept corresponding data without a problem. Consistent view of the object will be guaranteed after object completion. This view is not obliged to be built completely at once at the "complete" call 235. It can be constructed continuously in parallel with data transfers. In the case of a "de-synchronized" purely distributed file system, several different "complete" requests 235 initiated for the same object may come simultaneously to different parts of the metadata service. Alternatively, several blocks may be committed to the system while the metadata service is busy with processing a "complete" request 235. Resolution of described situations is implementation dependent. For example, all file system servers may be time-synchronized. In this case, only the oldest "complete" request 235 may be considered successful. Others will fail. Also, blocks committed after the first "complete" request 235 may be discarded and reported as such (see, "PROBLEM_BLOCKS" parameter of "complete" call below).

No performance overhead is caused by collision processing. If a node receiving a conflicting block is already "aware" of the collision, the node may just drop the block. If a node is not "aware" of the collision (e.g., when several different nodes receive different versions of the same block in parallel), the problem block may be dropped during the file completion or before that, as result of background activity.

Gaps detection arithmetic: a gap either occurs if an incomplete block was committed and it is not final, or no block was committed in a data range between two committed blocks, or a block collision was detected File reading is fast, since an absence of the gaps is guaranteed inside the file. Hence, there is no need to check if requested data overlaps with a gap.

No performance overhead is caused by ensuring cache coherency, because each block copy is either absolutely valid or absolutely invalid (will be discarded before object is completed). In addition, opening a file for Read while it is being written is not allowed.

If modifications of already existing objects are allowed, then cache consistency should be ensured after object completion: after object modification, some blocks at some nodes may expire and should be invalidated.

To complete a file after writing, a client issues a "complete" request (if a file is accessed by several clients operating under the same ID, normally only one of them should issue the request). As noted above, an exemplary functional specification for a complete operation is discussed further below in conjunction with FIG. 6. After that, the lease is released and the file becomes available for writing to clients operating under different ID.

There are several possible server replies to a "complete" request:
1) "fail" (e.g., due to some fatal File System error), which can be detailed by means of an exception parameter (see below).
2) "success, available for object-based access" (none of above Rules 1-2 were violated and no collisions happened). After that, the file may be accessed in both object-based and POSIX-like modes.
3) "success, available in POSIX-like mode only" (one or more of the above Rules 1-2 was violated and/or a collision happened). After that, the file is available for opening in POSIX-like mode only.

Additional response types for a "complete" request can optionally be provided.

The server can provide additional information to justify unavailability of the file in object-based mode. In this case, the server can provide a list of blocks that have gaps. There are three types of blocks with gaps (these types are reported along with the block numbers):
a. non-transferred blocks;
b. blocks that were dropped because of a collision; and
c. incomplete blocks (e.g., blocks that were transferred only once but were not full).

Additional types of "gaps" may optionally be added. For example, for a fully distributed file system with delayed coherency, the blocks submitted after a "complete" request but committed before the "complete" completion, may eventually be dropped. This situation may be reported to the client.

The file system 100 does not drop the incomplete blocks, because they may be useful for client-side debugging. Their data is preserved and may be accessed in a POSIX-like mode.

API Calls for Object-Based Mode

A number of exemplary API calls for working in object-based mode are discussed below. The write interface was discussed above.

Create Requests

As noted above, an object can be created in the file system 100. An exemplary create request can be expressed as follows:
 obj_Id=create(metadata_service, path_or_id, access_mask, OB_MODE, client_id, is_overwrite_allowed, &exception)
where "path_or_id" is a parameter or a group of parameters, that identify an object in a namespace. Depending on the implementation, "path_or_id" can be a regular path [/aaa/bbb/], or an S3-like pair of parameters [bucket=aaa, object_key=bbb], or another representation, that identifies the object unambiguously.

Figure 4:
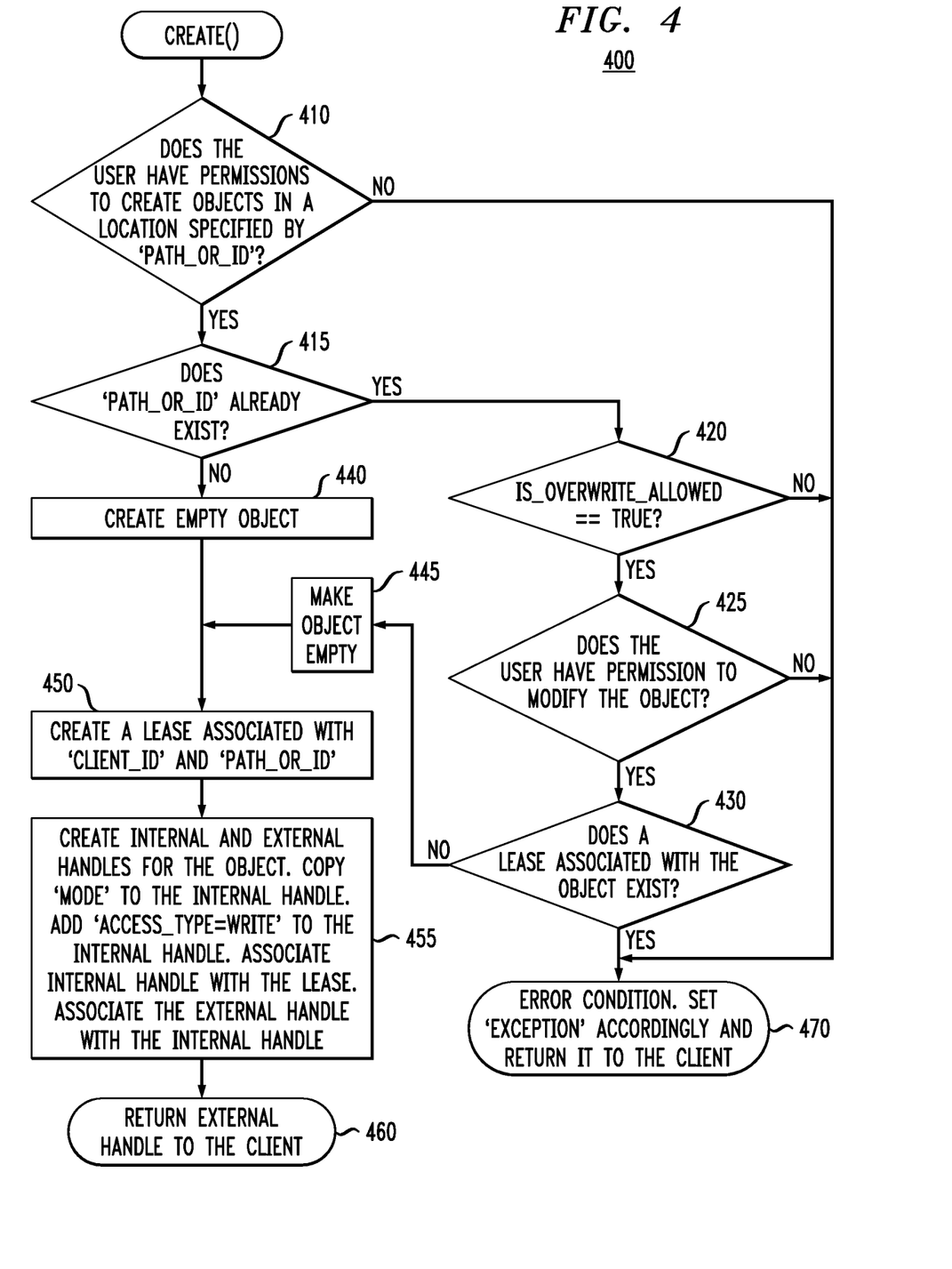
FIGS. 4 through 6 are flow charts illustrating an exemplary implementation of create, open and complete requests, respectively, according to various embodiments of the invention.

FIG. 4 is a flow chart illustrating an exemplary implementation of a create request 400 according to an embodiment of the invention. In FIG. 4, "User" refers to someone whose credentials were used to obtain access to 'metadata_service'.

As shown in FIG. 4, the exemplary create request 400 initially performs a test during step 410 to determine if the user has permissions to create objects in a location specified by 'path_or_id'. If it is determined during step 410 that the user has the permissions, then a further test is performed during step 415 to determine if the 'path_or_id' already exists. If the 'path_or_id' already exists then a further test is performed during step 420 to determine if overwrite_allowed is set to true. If overwrite_allowed is not set to true, then program control proceeds to step 470 for an error condition, where 'exception' is set accordingly and returned to the client.

If overwrite_allowed is set to true, however, a further test is performed during step 425 to determine if the user has permission to modify the object. If the user does not have permission to modify the object, then program control proceeds to step 470 for error handling, in the manner described above.

If the user does have permission to modify the object, then a further test is performed during step 430 to determine if a lease associated with the object exists. If a lease associated with the object does exist, then program control proceeds to step 470 for error handling, in the manner described above.

If a lease associated with the object does not already exist, then the object is made empty during step 445 and program control proceeds to step 450, discussed below.

If it was determined during step 415 that the 'path_or_id' does not already exist, then an empty object is created during step 440.

A lease associated with 'client_id' and 'path_or_id' is created during step 450. During step 455, internal and external handles are created for the object. 'mode' is copied to the internal handle; 'access_type=WRITE' is added to the internal handle; internal handle is associated with the lease; and the external handle is associated with the internal handle. The external handle is returned to the client during step 460.

Open Requests

As noted above, an object can be opened in the file system 100. An exemplary open request can be expressed as follows:

obj_handle = open( metadata_service, path_or_id, mode, access_type, client_id, &exception)
where "mode" can be either "OB_MODE" or "PL_MODE".
 If 'mode == OB_MODE', 'access_type' can be only 'READ' or 'WRITE'.
 If 'mode == PL_MODE', 'access_type' can be 'READ', 'WRITE', or 'READ-WRITE'.

Only one internal handle can be associated with a particular lease. Multiple external handles can be associated with a single internal handle. Lease is associated with a particular client. When a lease is taken for 'READ' in Object-based mode, however, its association with a particular client is irrelevant.

Thus, in an "open" call, "OB_MODE" may be combined with "READ" or "WRITE" access modes only. Simultaneous reading and writing is not allowed in "OB_MODE." If the requested file is unavailable for opening in object-based mode, a corresponding exception will be raised: "File cannot be opened in OB_MODE". It also should be noted that HDFS, for example, does not require opening files for reading. The disclosed file system 100 introduces the "open" call for reading, since the following situation could happen:
 client expects that data is available as an object→but file has gaps→it still may be read in POSIX-like mode only, which is slow→but silent use of POSIX-like mode may diverge with client expectations. The client may expect that the file looks like an object and may be read in fast mode while in fact it does not.

In addition, "open"—when executed with OB_MODE—will take a lease, which will guarantee that the object will not be modified in PL_MODE while it is read in OB_MODE.

Also, HDFS does not allow opening already existing files for writing. Modification of objects may or may not be allowed in the disclosed file system 100, as discussed above.

Figure 5:
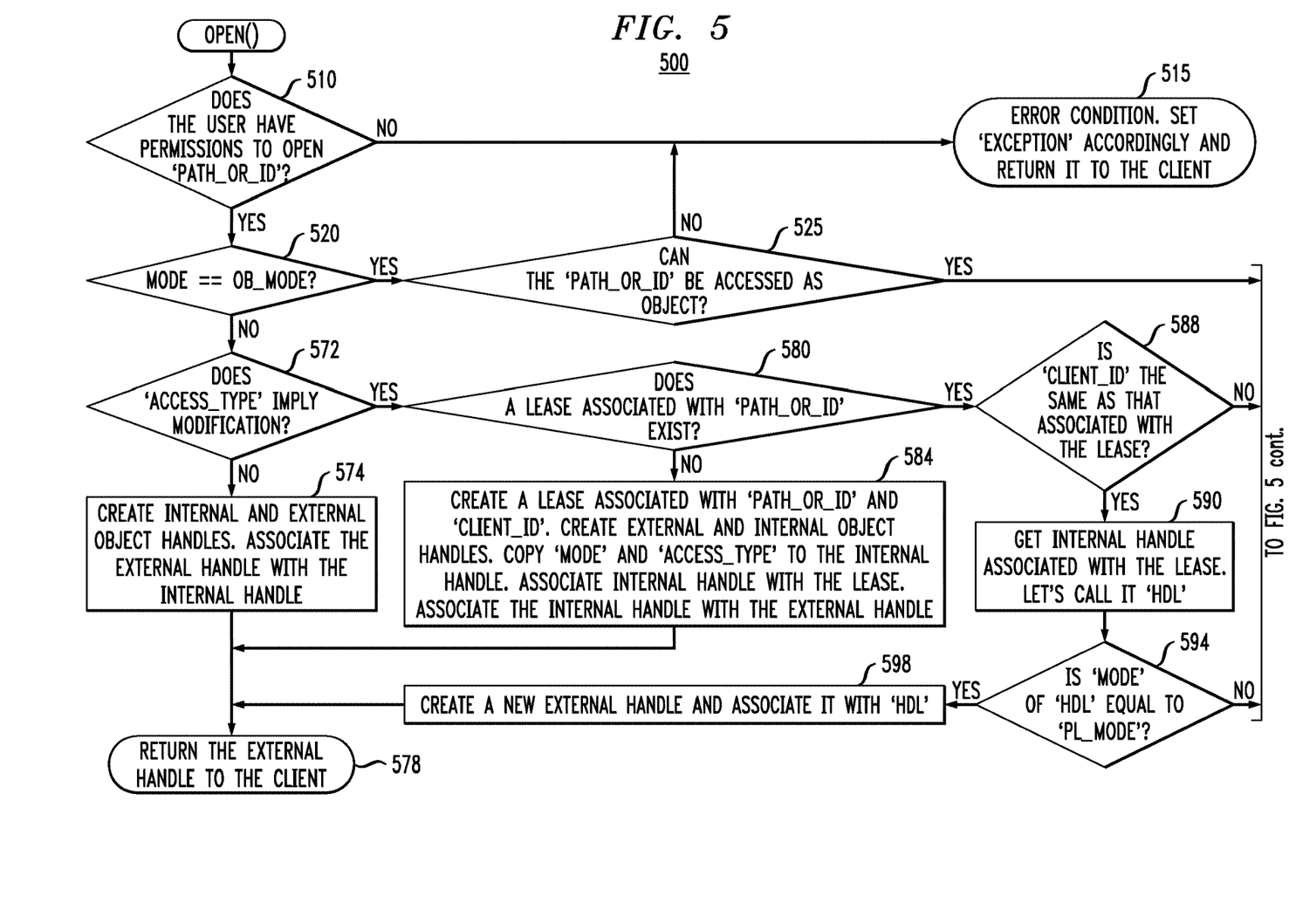

FIG. 5 is a flow chart illustrating an exemplary implementation of an open request 500 according to an embodiment of the invention. As shown in FIG. 5, the exemplary open request 500 initially performs a test during step 510 to determine if the user has permissions to open 'path_or_id'. If it is determined during step 510 that the user does not have the permissions, then an error condition is flagged in step 515, by setting 'exception' accordingly and returning it to the client.

If, however, it is determined during step 510 that the user has the permissions, then a further test is performed during step 520 to determine if mode is set to OB_MODE. If mode is set to OB_MODE, then a further test is performed during step 525 to determine if the 'path_or_id' can be accessed as an object. If the 'path_or_id' can be accessed as an object, then a further test is performed during step 530 to determine if a lease associated with 'path_or_id' exists.

If a lease associated with 'path_or_id' does not exist, a lease associated with 'path_or_id' and 'client_id' is created during step 535. An internal object handle 'HDL' is created; 'mode' and 'access_type' are copied to 'HDL'; and 'HDL' is associated with the lease. An external handle is created during step 540 and the external handle is associated with 'HDL'. Thereafter, the external handle is returned to the client during step 570.

If is determined during step 530 that a lease associated with 'path_or_id' does exist, then a further test is performed during step 555 to determine if access_type is set to READ. If access_type is not set to READ, then an error condition is flagged during step 558, by setting 'exception' accordingly and returning it to the client.

If access_type is not set to READ, then an internal object handle associated with the lease is obtained during step 560, referred to as 'HDL'. A further test is performed during step 565 to determine if 'access_type' of 'HDL' is equal to 'READ'. If 'access_type' of 'HDL' is equal to 'READ', program control proceeds to step 540, discussed above.

If, however, 'access_type' of 'HDL' is not equal to 'READ', then program control proceeds to step 558 for error handling, in the manner described above.

If it was determined during step 520 that mode is not set to OB_MODE, then a further test is performed during step 572 to determine if 'access_type' implies modification. If the 'access_type' does not imply modification, then internal and external object handles are created during step 574 and the external handle is associated with the internal handle. Program control then proceeds to step 578 to return the external handle to the client.

If it was determined during step 572 that 'access_type' implies modification, a further test is performed during step 580 to determine if a lease associated with 'path_or_id' exists. If a lease associated with 'path_or_id' does not exist, a lease associated with 'path_or_id' and 'client_id' is created during step 584. In addition, external and internal object handles are created; 'mode' and 'access_type' are copied to the internal handle; internal handle is associated with the lease; and the internal handle is associated with the external handle. Program control then returns during step 578, in the manner described above.

If it was determined during step 580 that a lease associated with 'path_or_id' exists, a further test is performed during step 588 to determine if 'client_id' is the same as that associated with the lease. If 'client_id' is not the same as that associated with the lease, then program control proceeds to step 558 for error handling, in the manner described above.

If, however 'client_id' is the same as that associated with the lease, then the internal handle associated with the lease is obtained during step 590, and is referred to as 'HDL'. A further test is performed during step 594 to determine if the 'mode' of 'HDL' is equal to TL_MODE'. If the 'mode' of 'HDL' is not equal to PL_MODE', then program control proceeds to step 558 for error handling, in the manner described above.

If the 'mode' of 'HNDL' is equal to 'PL_MODE', then a new external handle is created during step 598 and it is associated with 'HDL'. Program control then returns during step 578, in the manner described above.

Complete Requests

As noted above, an object can be completed in the file system 100. An exemplary complete request can be expressed as follows:

result=complete(metadata_service, obj_handle, client_id, &PROBLEM_BLOCKS, &exception), where obj_handle is the object handle returned by 'open( )' or 'create( )', discussed above.

If the "PROBLEM_BLOCKS" parameter is not zero, the client needs justification in case when a file will not be available for accessing in object-based mode. Based on this justification, the client may re-transfer problem blocks (e.g., close gaps), and the file will become available for opening in object-based mode. Before gaps are closed, however, the client can operate on the file only in POSIX-like mode.

Figure 6:
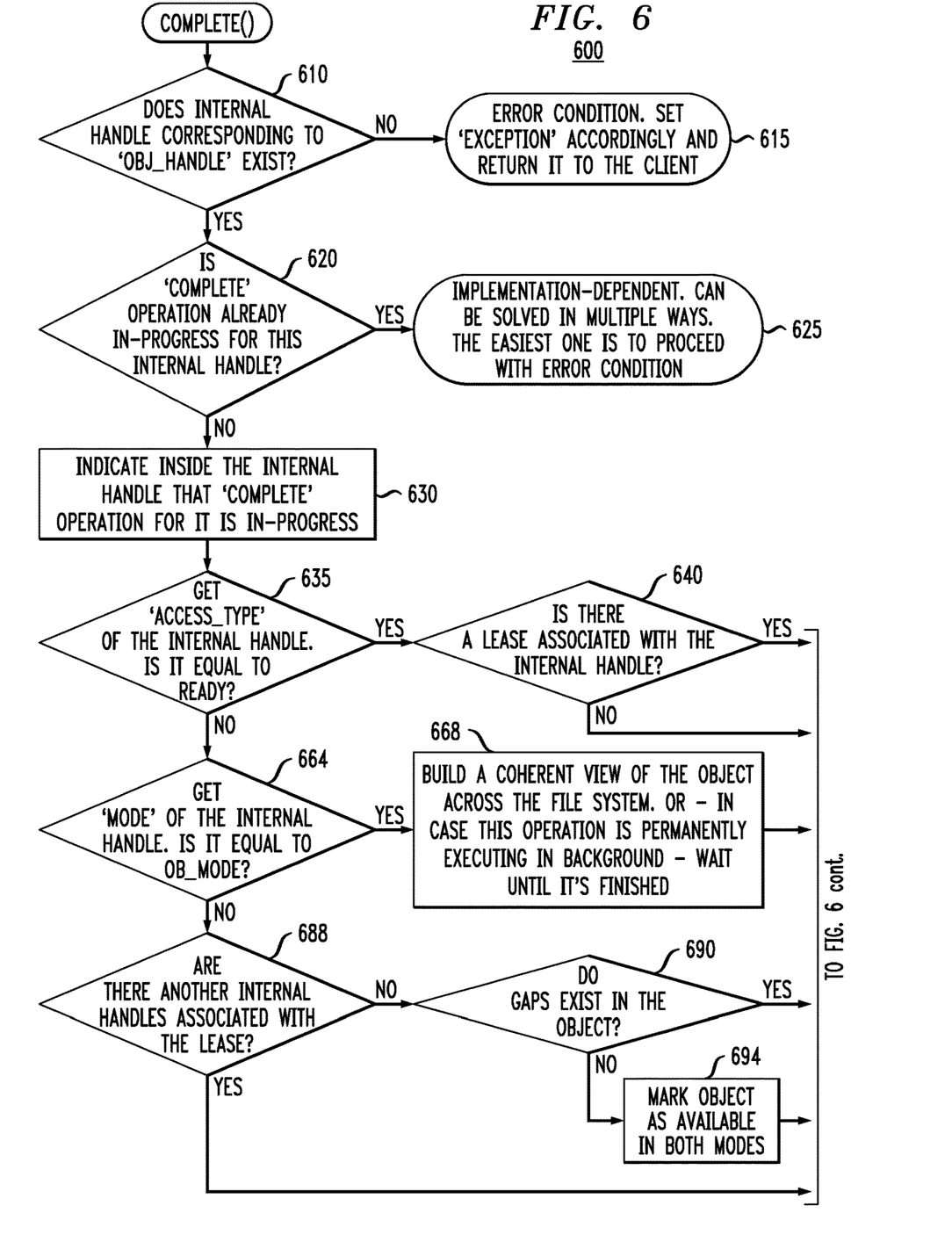

FIG. 6 is a flow chart illustrating an exemplary implementation of a 'complete' request 600 according to an embodiment of the invention. As shown in FIG. 6, the exemplary 'complete' request 600 initially performs a test during step 610 to determine if an internal handle corresponding to 'obj_handle' exists. If it is determined during step 610 that an internal handle corresponding to 'obj_handle' does not exist, then program control proceeds to step 615 for error handling, in the manner described above.

If, however, it is determined during step 610 that an internal handle corresponding to 'obj_handle' exist, then a further test is performed during step 620 to determine if a 'complete' operation is already in-progress for the internal handle. If a 'complete' operation is already in-progress for the internal handle, then the handling during step 625 is implementation-dependent and can be solved in multiple ways, as would be apparent to a person of ordinary skill in the art, such as proceeding with an error condition.

If a 'complete' operation is not already in-progress for the internal handle, then step 630 indicates that inside the internal handle that 'complete' operation for it is in-progress. A test is performed during step 635 to determine if the 'access_type' of the internal handle is equal to READ.

If it is determined during step 635 that the 'access_type' of the internal handle is equal to READ, then a further test is performed during step 640 to determine if there is a lease associated with the internal handle. If there is a lease associated with the internal handle, then a further test is performed during step 645 to determine if there are other internal handles associated with the lease. If there are no other internal handles associated with the lease, then the lease is released during step 650 and then the internal handle is destroyed during step 655. Also, if there is not a lease associated with the internal handle (step 640) then the internal handle is destroyed during step 655. "Success" is returned to the client during step 660.

If it was determined during step 635 that the 'access_type' of the internal handle is not equal to READ, then a further test is performed during step 664 to determine if the 'mode' of the internal handle is equal to OB_MODE. If the 'mode' of the internal handle is equal to OB_MODE, then a coherent view of the object is built across the file system 100 during step 668. Alternatively, in case this operation is permanently executing in background, wait until the operation is finished.

A test is performed during step 670 to determine if gaps exist in the object. If it is determined during step 670 that gaps do not exist in the object, then the object is marked as available in both modes during step 674. The lease associated with the internal handle is released during step 678. The internal handle is destroyed during step 680 and "success" is returned to the client during step 660, in the manner described above.

If, however, it was determined during step 670 that gaps exist in the object, then a list of 'PROBLEM_BLOCKS' is composed during step 682, and the object is marked as available in PL_MODE' only during step 684. Program control then proceeds to step 678 and continues in the manner described above.

If it was determined during step 664 that the 'mode' of the internal handle is not equal to OB_MODE, then a further test is performed during step 688 to determine if there are other internal handles associated with the lease. If there are other internal handles associated with the lease, program control then proceeds to step 680 and continues in the manner described above.

If there are no other internal handles associated with the lease, then a further test is performed during step 690 to determine if gaps exist in the object. If gaps exist in the object, program control then proceeds to step 684 and continues in the manner described above.

If gaps do not exist in the object, then the object is marked as available in both modes during step 694 and then program control proceeds to step 678 and continues in the manner described above.

POSIX-Like Mode Details

The POSIX-like mode of operation is the most general mode but is expected to introduce a significant performance overhead when compared to the object-based mode. This overhead, however, in most cases, should not be bigger than that of already existing remote file system implementations (e.g., NFS in Isilon).

The main idea behind the POSIX-like mode is that all POSIX file access operations may be mapped to operations of the disclosed file system 100. POSIX style of data manipulation is also possible (random access, gaps, and so on). There is a significant difference from POSIX: clients operating under different IDs cannot modify a single file simultaneously. Only the clients that own the lease to that file can modify the file. If someone wants several different clients to modify a single file concurrently, he/she should make sure that all of them do that under the same ID.

In one or more exemplary embodiments, the following is guaranteed for the POSIX-like mode:

1) Gaps are allowed.
2) Incomplete blocks are allowed to be committed.
3) Collision handling: collisions are allowed, as discussed above in conjunction with FIG. 3. Different blocks with the same ordinal number will be committed. For blocks with the same ordinal number, if a client receives an acknowledgement about block commit, then for any commit initiated by any client after that point, in case of data overlap with the previous block, the new data overwrites the old data, as shown in FIG. 3.
4) A file may be opened in any POSIX-compatible mode: READ, WRITE, READ-WRITE, APPEND, etc.
5) If, after a file modification, it turns out that the file has no gaps, the file is allowed to be accessed in an object-based manner.
6) A file can be opened for reading while it is being written.

Since gaps and incomplete block transfers are allowed, and collision handling is enabled, some arithmetic calculations may be made at each read or write request executed in POSIX-like mode. Also, strong cache coherency should be maintained. All these factors limit the performance of the mode.

File completion is performed in this mode in the same way as in object-based mode, as discussed above in conjunction with FIG. 6. The server responses to "complete" request are also the same, except that "PROBLEM_BLOCKS" parameter is ignored, since all kinds of blocks are accepted in POSIX-like mode.

A number of exemplary API calls for working in POSIX-like mode are discussed below, and operate in a similar manner to the object-based mode discussed above in conjunction with FIGS. 4-6.

--- file_id = create( metadata_service, path_or_id, access_mask, PL_MODE, client_id, is_overwrite_allowed, &exception)
open( metadata_service, path_or_id, PL_MODE, READ | WRITE | READ-WRITE | APPEND, client_id, &exception)
result = complete( metadata_service, file_handle, client_id, &PROBLEM_BLOCKS, &exception)

The "PL_MODE" parameter in the "create" call signals that the file will be transferred in a POSIX-like mode.

In the "open" call, "PL_MODE" may be combined with "READ", "WRITE", "READ-WRITE", "APPEND" access modes. Any file housed by the file system 100 can be opened in a POSIX-like operating mode.

The necessity for the "open" call for file reading was justified in the section entitled "Object-Based Mode Details".

The "PROBLEM_BLOCKS" parameter of "complete" call can be ignored.

---

CONCLUSION

From the perspective of the interface, file reading in an object-based mode is substantially identical to file reading in a POSIX-like mode. It also does not differ from already existing implementations. One aspect of the invention addresses the necessity to open the file before reading and the necessity to declare operating mode explicitly at file open stage. Actually, the necessity to open files for reading may be eliminated, but in this case, user expectations may not be met by the file system 100. The user may expect that a file is available in object-based mode, but in fact, the file may be available in POSIX-like mode only. Also, the file may be being modified at the moment. In these cases, object integrity and high transfer rates expected by the user will not be achieved.

It also should be noted that in object-based mode, clients are not obliged to read data in complete blocks. They may request any amount of data at any offset.

The foregoing applications and associated embodiments should be considered as illustrative only, and numerous other embodiments can be configured using the techniques disclosed herein, in a wide variety of different cryptography applications.

It should also be understood that the distributed file system with multi-stream object-based upload, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The distributed file system may be implemented using one or more processing platforms. One or more of the processing modules or other components may therefore each run on a computer, storage device or other processing platform element. A given such element may be viewed as an example of what is more generally referred to herein as a "processing device."

Figure 7:
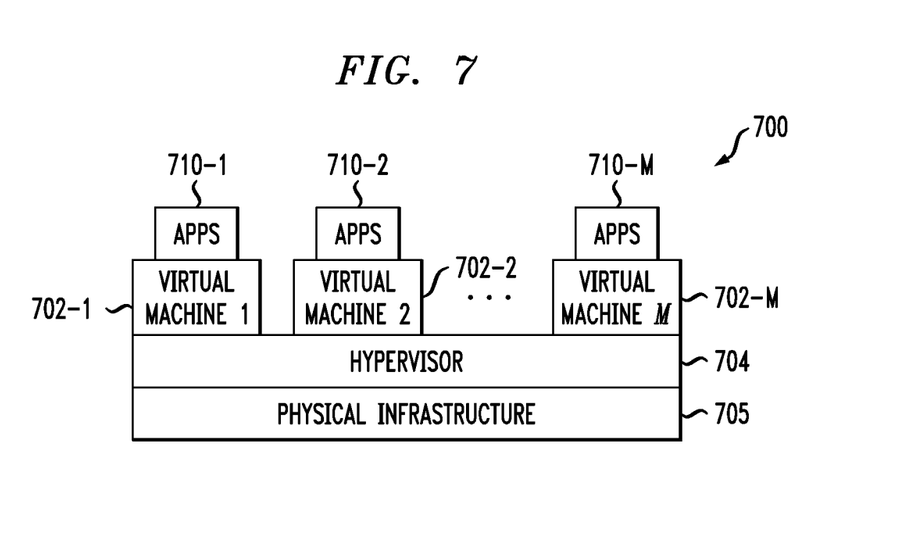
FIG. 7 illustrates an exemplary processing platform that may be used to implement at least a portion of one or more embodiments of the invention comprising a cloud infrastructure.

Referring now to FIG. 7, one possible processing platform that may be used to implement at least a portion of one or more embodiments of the invention comprises cloud infrastructure 700. The cloud infrastructure 700 in this exemplary processing platform comprises virtual machines (VMs) 702-1, 702-2, . . . 702-M implemented using a hypervisor 704. The hypervisor 704 runs on physical infrastructure 705. The cloud infrastructure 700 further comprises sets of applications 710-1, 710-2, . . . 710-M running on respective ones of the virtual machines 702-1, 702-2, . . . 702-M under the control of the hypervisor 704.

The cloud infrastructure 700 may encompass the entire given system or only portions of that given system, such as one or more of client, servers, controller, authentication server or relying server in the system.

Although only a single hypervisor 704 is shown in the embodiment of FIG. 7, the system may of course include multiple hypervisors each providing a set of virtual machines using at least one underlying physical machine.

An example of a commercially available hypervisor platform that may be used to implement hypervisor 704 and possibly other portions of the system in one or more embodiments of the invention is the VMware® vSphere™ which may have an associated virtual infrastructure management system, such as the VMware® vCenter™. The underlying physical machines may comprise one or more distributed processing platforms that include storage products, such as VNX™ and Symmetrix VMAX™, both commercially available from EMC Corporation of Hopkinton, Mass. A variety of other storage products may be utilized to implement at least a portion of the system.

In some embodiments, the cloud infrastructure additionally or alternatively comprises a plurality of containers implemented using container host devices. For example, a given container of cloud infrastructure illustratively comprises a Docker container or other type of LXC. The containers may be associated with respective tenants of a multi-tenant environment of the file system 100, although in other embodiments a given tenant can have multiple containers. The containers may be utilized to implement a variety of different types of functionality within the file system 100. For example, containers can be used to implement respective compute nodes or cloud storage nodes of a cloud computing and storage system. The compute nodes or metadata servers may be associated with respective cloud tenants of a multi-tenant environment of file system 100. Containers may be used in combination with other virtualization infrastructure such as virtual machines implemented using a hypervisor.

Figure 8:
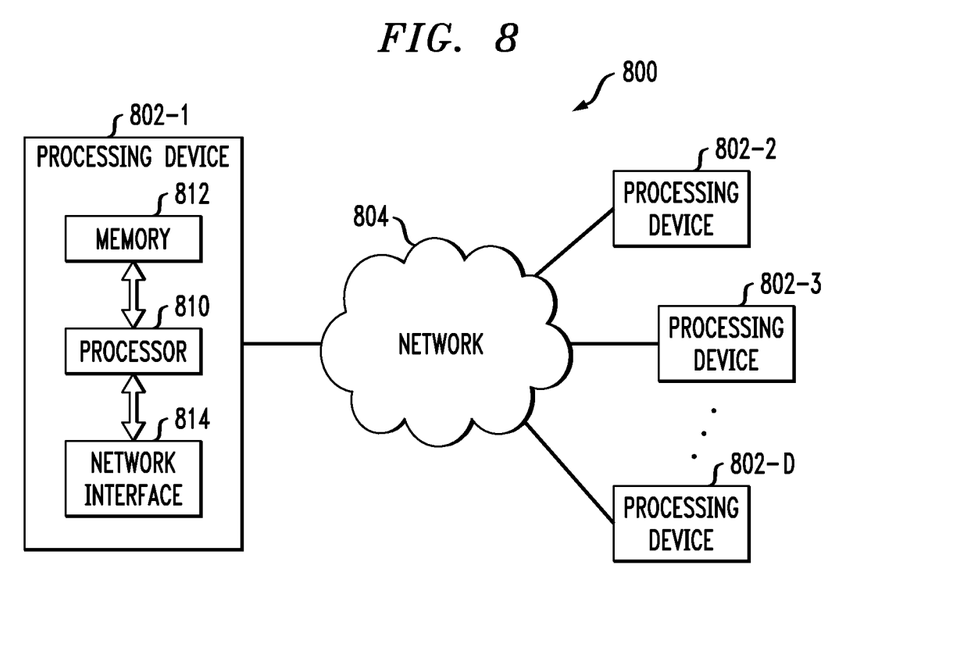
FIG. 8 illustrates another exemplary processing platform that may be used to implement at least a portion of one or more embodiments of the invention.

Another example of a processing platform is processing platform 800 shown in FIG. 8. The processing platform 800 in this embodiment comprises at least a portion of the given system and includes a plurality of processing devices, denoted 802-1, 802-2, 802-3, . . . 802-D, which communicate with one another over a network 804. The network 804 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 802-1 in the processing platform 800 comprises a processor 810 coupled to a memory 812. The processor 810 may comprise a microprocessor, a microcontroller, an application specific integrated circuit (ASIC), a field programmable gate array (FPGA) or other type of processing circuitry, as well as portions or combinations of such circuitry elements, and the memory 812, which may be viewed as an example of a "computer program product" having executable computer program code embodied therein, may comprise random access memory (RAM), read only memory (ROM) or other types of memory, in any combination.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and the given system may include additional or alternative processing platforms, as well as numerous distinct processing platforms in any combination, with each such platform comprising one or more computers, storage devices or other processing devices.

Multiple elements of system may be collectively implemented on a common processing platform of the type shown in FIG. 7 or 8, or each such element may be implemented on a separate processing platform.

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a tangible recordable medium (e.g., floppy disks, hard drives, compact disks, memory cards, semiconductor devices, chips, application specific integrated circuits (ASICs)) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

It should again be emphasized that the above-described embodiments of the invention are presented for purposes of illustration only. Many variations and other alternative embodiments may be used. For example, the techniques are applicable to a wide variety of other types of file systems that can benefit from the multi-stream object-based upload techniques disclosed herein. Also, the particular configuration of storage system and processing device elements shown herein, and the associated multi-stream object-based upload techniques, can be varied in other embodiments. Moreover, the various simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. A distributed file system, comprising:
a plurality of client processing nodes, wherein one or more of said plurality of client processing nodes are configured to access both an object-based mode and a POSIX-style mode using a uniform interface; and
a plurality of storage nodes, wherein said one or more of said plurality of client processing nodes switch between one or more of said object-based mode and said POSIX-style mode to transfer multiple portions of the same data entity substantially simultaneously to one or more of said storage nodes, wherein committed data containing at least one error that was transferred using said object-based mode becomes unavailable for further object-based access until said at least one error is repaired using said POSIX-style mode, wherein the at least one error comprises one or more gaps in the committed data, wherein the at least one error is repaired using said POSIX-style mode by filling said one or more gaps in said committed data, and wherein said committed data is marked as available for access by both said object-based mode and said POSIX-style mode in response to said at least one error being repaired.

2. The distributed file system of claim 1, wherein said multiple portions of the same data entity are committed to the distributed file system in parallel.

3. The distributed file system of claim 1, wherein said multiple portions of the same data entity comprise blocks and wherein multiple blocks are committed substantially simultaneously.

4. The distributed file system of claim 1, wherein a user that modifies an existing data entity can change the existing data entity from a legacy file to an object.

5. The distributed file system of claim 1, wherein one or more clients write the same portion of the same data entity multiple times.

6. The distributed file system of claim 5, wherein after a client receives an acknowledgement that a block has been committed, then for any subsequent commit, new data overwrites old data in case of a data overlap with a previous block.

7. The distributed file system of claim 1, wherein the uniform interface enables one or more of the multiple portions of the same data entity to be finalized at any time during said transfer.

8. The distributed file system of claim 1, wherein a user that modifies an existing data entity can change the existing data entity from an object to a legacy file.

9. A client processing node in a distributed file system, the client processing node comprising: a memory; and at least one processing device, coupled to the memory, operative to: access both an object-based mode and a POSIX-style mode using a uniform interface; and transfer multiple portions of the same data entity substantially simultaneously to one or more storage nodes in said distributed file system by switching between the one or more of the object-based mode and the POSIX-style mode, wherein committed data containing at least one error that was transferred using said object-based mode becomes unavailable for further object-based access until said at least one error is repaired using said POSIX-style mode, wherein the at least one error comprises one or more gaps in the committed data, wherein the at least one error is repaired using said POSIX-style mode by filling said one or more gaps in said committed data, and wherein said committed data is marked as available for access by both said object-based mode and said POSIX-style mode in response to said at least one error being repaired.

10. The client processing node of claim 9, wherein said multiple portions of the same data entity are committed to the distributed file system in parallel.

11. The client processing node of claim 9, wherein said multiple portions of the same data entity comprise blocks and wherein multiple blocks are committed substantially simultaneously.

12. The client processing node of claim 9, wherein a user that modifies an existing data entity can one or more of change the existing data entity from a legacy file to an object and from the existing data entity object to a legacy file.

13. The client processing node of claim 9, wherein one or more clients write the same portion of the same data entity multiple times.

14. The client processing node of claim 13, wherein after a client receives an acknowledgement that a block has been committed, then for any subsequent commit, new data overwrites old data in case of a data overlap with a previous block.

15. The client processing node of claim 9, wherein the uniform interface enables one or more of the multiple portions of the same data entity to be finalized at any time during said transfer.

16. A method performed by a client processing node in a distributed file system, comprising: accessing both an object-based mode and a POSIX-style mode using a uniform interface; and transferring multiple portions of the same data entity substantially simultaneously to one or more storage nodes in said distributed file system by switching between one or more of the object-based mode and the POSIX-style mode, wherein committed data containing at least one error that was uploaded using said object-based mode becomes unavailable for further object-based access until said at least one error is repaired using said POSIX-style mode, wherein the at least one error comprises one or more gaps in the committed data, wherein the at least one error is repaired using said POSIX-style mode by filling said one or more gaps in said committed data, and wherein said committed data is marked as available for access by both said object-based mode and said POSIX-style mode in response to said at least one error being repaired.

17. The method of claim 16, wherein said multiple portions of the same data entity comprise blocks and wherein multiple blocks are committed substantially simultaneously in parallel.

18. The method of claim 16, wherein a user that modifies an existing data entity can one or more of change the existing data entity from a legacy file to an object and from the existing data entity object to a legacy file.

19. The method of claim 16, wherein one or more clients write the same portion of the same data entity multiple times.

20. The method of claim 19, wherein after a client receives an acknowledgement that a block has been committed, then for any subsequent commit, new data overwrites old data in case of a data overlap with a previous block.

21. A non-transitory machine-readable recordable storage medium, wherein one or more software programs when executed by one or more processing devices implement the steps of the method of claim 16.

22. The method of claim 16, wherein the uniform interface enables one or more of the multiple portions of the same data entity to be finalized at any time during said transfer.

* * * * *